United States Patent [19]

Pease et al.

[11] 3,778,166

[45] Dec. 11, 1973

[54] BIPOLAR AREA CORRELATOR

[75] Inventors: Richard R. Pease, Hingham; Frank Blitzer, Framingham; Arthur A. Giordano, Burlington; Frank L. Less, Wrentham, all of Mass.

[73] Assignee: GTE Sylvania Incorporated, Stamford, Conn.

[22] Filed: Feb. 26, 1973

[21] Appl. No.: 336,005

[52] U.S. Cl. .................... 356/71, 356/157, 356/158

[51] Int. Cl. .................... G06k 9/08

[58] Field of Search .................... 356/157, 156, 158, 356/163, 71; 178/6

[56] References Cited

UNITED STATES PATENTS

| | | | |
|---|---|---|---|
| 3,652,162 | 3/1972 | Noble | 356/71 |
| 3,624,605 | 11/1971 | Aagard | 356/71 |

OTHER PUBLICATIONS

"Image Transformations For Pattern Recognition Using Incoherent Illumination and Bipolar Aperature Masks," by Trabka, et al., JOSA Vol. 54 No. 10 October, 1964 pg. 1,242–1,252.

"Image Detection Through Bipolar Correlation," by A. Arcesse, et al., IEEE Transactions on Information Theory Vol. IT–16, No. 5, September, 1970 pg. 534–541.

*Primary Examiner*—Ronald L. Wibert
*Assistant Examiner*—Paul K. Godwin
*Attorney*—Norman J. O'Malley et al.

[57] ABSTRACT

An optical area correlator employing a cathode ray tube for producing an image of a scene illuminated with incoherent light. Light rays from the image of the scene pass through transparent regions of a bipolar reference representing a feature being sought in the scene. By any of various means the transparent regions designating positive values of the reference are distinguished from the transparent regions designating negative values. The positive and negative components of light passing through the positive and negative transparent regions of the reference are separated so as to form separate + and − correlation images, respectively. The two correlation images are separately viewed by a TV camera or cameras and the resulting electrical signals are algebraically added by a linear subtractor. The output of the subtractor is the correlation output which is a measure of the degree of correlation of the reference with the scene. This output may be applied to a TV monitor which produces a resultant correlation image for direct viewing in essentially real time.

23 Claims, 6 Drawing Figures

BIPOLAR AREA CORRELATOR

BACKGROUND OF THE INVENTION

This invention relates to optical area correlators. More particularly, it is concerned with apparatus for detecting the presence of a particular feature in a scene by measuring the degree of correlation of a bipolar reference of the feature with an image of the scene.

Correlators employ a reference of a particular feature to determine the presence of the particular feature in a scene being investigated. Most previously known types of correlators may be considered either optical or non-optical. Optical correlators include correlators which employ coherent light as from a laser to measure the correlation between an image of a scene and a reference. Coherent correlators are expensive and technically sophisticated devices which require a photographic transparency of the scene being investigated. Correlators which employ incoherent light are relatively inexpensive devices and may operate from a cathode ray tube displaying an image of the scene being investigated rather than a transparency. Correlators of this type operate on the principle that when a planar image of a scene and a reference are spaced at some interval and the scene illuminated with diffused incoherent light, cross-correlation of the intensities of the scene and reference instantaneously occurs on a third out-of-focus correlation plane.

It has been established that the reference of a feature which provides a maximum signal-to-noise ratio of the correlation information is a bipolar reference, that is a reference of unique signature in which both positive and negative values are present. See, for example, an article by Eugene A. Trabka and Paul G. Roetling entitled "Image Transformations for Pattern Recognition Using Incoherent Illumination and Bipolar Aperture Masks" appearing in the Journal of the Optical Society of America, Volume 54, No. 10, October, 1964; and an article by A. Arcese, P. H. Mengert, and E. W. Trombini entitled "Image Detection Through Bipolar Correlation" appearing in the IEEE Transactions on Information Theory, Volume IT-16, No. 5, September, 1970. However, heretofore it has been impractical to provide an incoherent optical correlation system capable of employing both positive and negative values in a reference. One attempt at providing such an apparatus is discussed in the article by Trabka and Roetling.

Non-optical correlators are implemented by digital signal processing techniques and, therefore, references may include both positive and negative values since correlation is determined by computation and not by the use of light and images. However, non-optical techniques require the conversion of all imagery to a digital form and the storage of voluminous amounts of data. In addition, the measuring of correlation is a non-real time operation for high resolution and for large areas.

SUMMARY OF THE INVENTION

Apparatus in accordance with the present invention employs optical techniques to provide a bipolar area correlator for correlating a bipolar reference of a feature being sought with an image of a scene being investigated. A bipolar area correlator in accordance with the invention includes an image producing means for producing an image of a scene to be investigated. A reference which represents a feature to be correlated with the image of a scene has first (positive) and second (negative) transparent regions. The first transparent regions designate the positive values of the intensities of the reference and the second transparent regions designate the negative values of the intensities of the reference. The apparatus also includes first (positive) and second (negative) correlation planes at which are formed respective first and second correlation images. The apparatus also includes a first image converting means for converting a first correlation image at said first correlation plane to electrical signals and a second image converting means for converting a second correlation image at said second correlation plane to electrical signals.

A first optical control means permits light rays from the image of a scene produced by the image producing means which pass through the first transparent regions in the reference to impinge on the first correlation plane and form thereat a first correlation image which is converted to electrical signals by the first image converting means. The first optical control means also prevents light rays from the image of the scene which pass through the second transparent regions of the reference from reaching the first image converting means. A second optical control means permits light rays from the image of the scene which pass through the second transparent regions in the reference to impinge on the second correlation plane and form thereat a second correlation image which is converted to electrical signals by the second image converting means. The second optical control means also prevents light rays from the image of the scene which pass through the first transparent regions in the reference from reaching the second image converting means.

The electrical signals from the first and second image converting means are applied to a subtractor means which produces output signals which are the differences of the electrical signals from the first and second image converting means. Thus, the output of the subtractor means is the resultant of both positive and negative valves of intensities produced by the correlation process and provides a measure of the correlation of the feature with the scene.

Another embodiment of a bipolar area correlator in accordance with the invention employs only a single correlation plane and a single image converting means together with the image producing means and a bipolar reference. This apparatus includes optical control means for permitting light rays from the image of a scene produced by said image producing means which pass through the first transparent regions in the reference to impinge on the correlation plane and form a first correlation image at the plane which is converted to electrical signals by the image converting means, while preventing light rays from the image of the scene which pass through the second transparent regions in the reference from reaching the image converting means. The optical control means also permits light rays from the image of the scene which pass through the second transparent regions in the reference to impinge on the correlation plane and form a second correlation image at the plane which is converted to electrical signals by the image converting means, while preventing light rays from the image of the scene which pass through the first transparent regions in the reference from reaching the image converting means.

The apparatus also includes storage means coupled to the image converting means for storing the electrical signals produced by the image converting means when light rays from the image of a scene are passing through the first transparent regions in the reference and impinging on the correlation plane. A subtractor means is coupled to the image converting means and to the storage means and produces output signals which are the differences of the electrical signals stored in the storage means and the electrical signals produced by the image converting means when light rays from the image of the scene are passing through the second transparent regions in the reference and impinging on the correlation plane.

BRIEF DESCRIPTION OF THE DRAWINGS

Additional objects, features, and advantages of bipolar area correlators in accordance with the present invention will be apparent from the following detailed discussion together with the accompanying drawings wherein.

DETAILED DESCRIPTION OF THE INVENTION

INTRODUCTION

The two dimensional correlation operation is represented by the convolution integral $$c(u,v) = \iint I(x+u, y+v)\alpha(x,y)\, dx\, dy$$

where $c(u,v)$ is the correlation output for shifts $u$ and $v$ in the $x$ and $y$ directions, I is the light intensity distribution of the image of the scene being investigated, $\alpha$ is the intensity distribution of the reference. Optimum references are $\alpha$'s which maximize the quantity $c(u,v)$ in the integral. As shown in the articles by Trabka et al. and Arcese et al. the optimum reference to represent a feature is the two-dimensional matched filter for the feature which is approximated by $$\alpha(x,y) = I(x,y) - \gamma^2\nabla^2 I(x,y)$$

where $\gamma^2$ is a constant related to the statistics of the scene and $\nabla^2$ is the Laplacian operator. References which satisfy this expression generally are bipolar; that is, they contain both positive and negative values.

Figure 1:
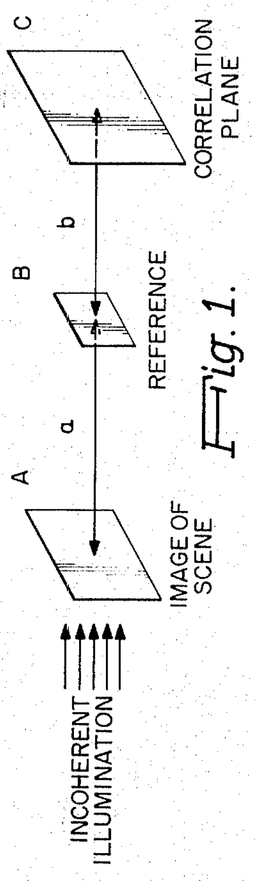
FIG. 1 is a diagram representing the basic elements of an incoherent light optical area correlator.

An incoherent area correlator is illustrated in the diagram of FIG. 1. An image of a scene being investigated which is illuminated by incoherent light is positioned in a first plane A. A reference representing a feature being sought in the scene is located at plane B. The resulting correlation output appears at a correlation plane C. The correlator may include a thin lens which is positioned at the plane B with the reference as close thereto as possible between the lens and the image of the scene at plane A. The image of the scene at plane A and the correlation plane C are positioned from the lens at distances a and b equal to the focal length of the lens. If the correlator does not employ a lens, the scale ratio A:B is equal to $(a+b)/b$.

Figure 2:
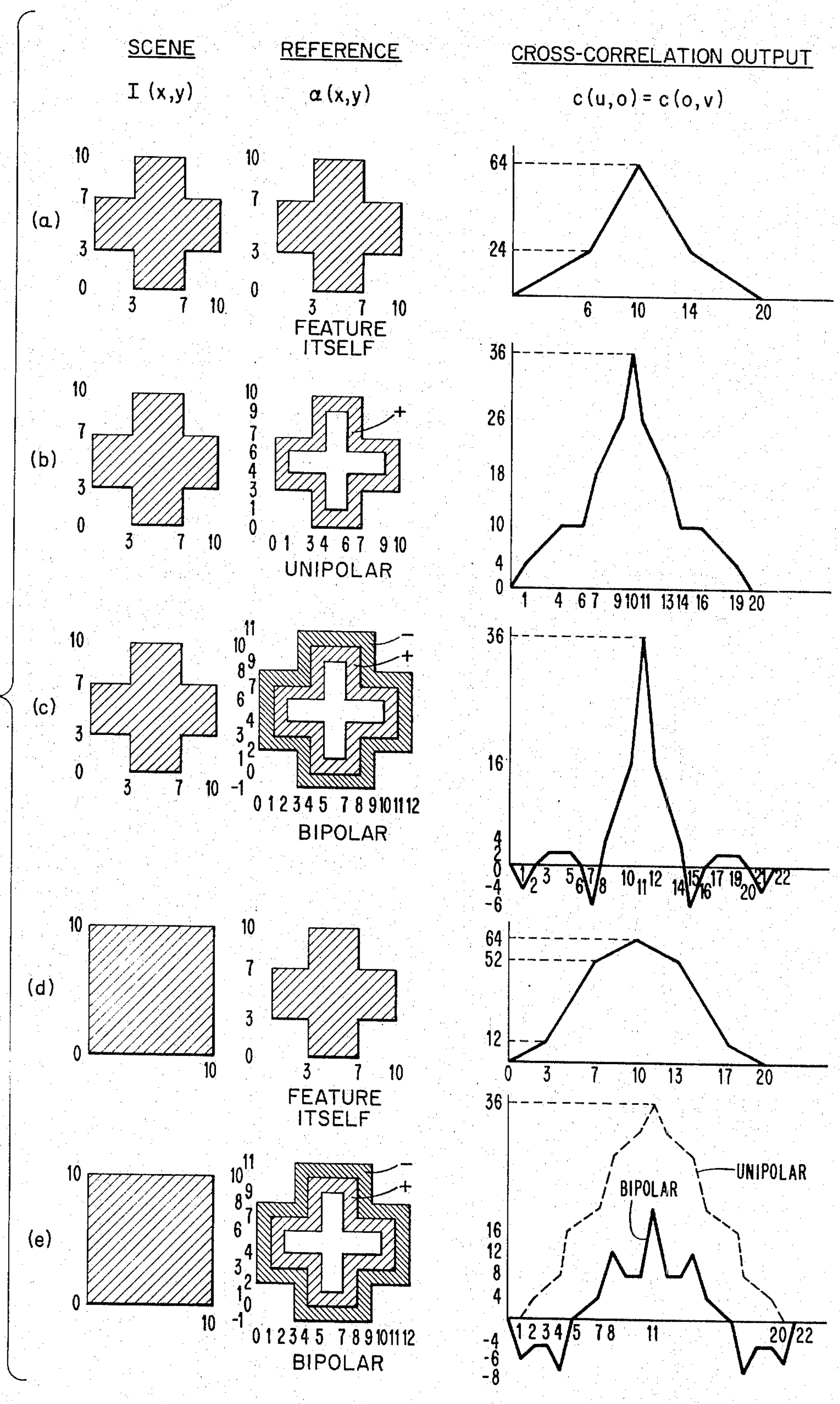
FIG. 2 (*a*) – 2 (*e*) are diagrams useful in explaining the cross-correlation of different types of references with a scene and the advantages obtained by employing bipolar references.

The manner in which bipolar references employed in a correlator such as illustrated in FIG. 1 provide superior results over other forms of references may be understood by a discussion of FIGS. 2(*a*) through 2(*e*). The discussion is theoretical and is not concerned with the practical aspects of handling both positive and negative values of light intensity. The first diagram of each of the FIGS. 2(*a*) – 2(*e*) illustrates a scene which is to be investigated for a particular object or feature. The image of the scene is positioned at plane A in FIG. 1 and is illuminated with incoherent light. Each second diagram is a reference representing the feature being sought in the scene. The reference is located at plane B in FIG. 1. The third diagrams are the resulting correlation outputs, in one dimension only, occurring at the correlation plane C in FIG. 1. In the present example, the feature being sought is a cross, the references are the cross itself, a unipolar representation of the cross, and a bipolar representation of the cross. Both the unipolar and bipolar references shown are arbitrary selections for illustrative purposes. The unipolar reference is an inner outline of the cross with positive values assigned (the first derivative of the feature). The bipolar reference is an inner outline of the cross with positive values assigned together with an outer outline of the cross with negative values assigned (the second derivative of the feature). Other areas of the references are opaque.

FIGS. 2(*a*), (*b*), and (*c*) show the correlation output for references consisting of the cross itself, the unipolar, and the bipolar outlines of the cross, respectively, when the scene does contain a cross. FIGS. 2(*d*) and (*e*) show the correlation output for the various references when the scene does not contain a cross, but instead consists of a square of approximately the same overall dimensions as the cross.

The graphs of correlation output clearly indicate the advantages of an optimum bipolar reference. As can be seen in FIGS. 2(*a*) and (*d*) the feature itself provides a high degree of correlation for both the cross and the square, thus making a correct distinction extremely difficult. The unipolar reference of FIGS. 2(*b*) and (*e*) does not provide much better discrimination. On the other hand, as can be seen from FIG. 2(*c*), the bipolar reference produces a high degree of correlation when the feature is present with the negative side lobes providing a high peak-to-side lobe ratio. As shown in FIG. 2(*e*) the bipolar reference produces a very low degree of correlation with the square. Thus, the presence or absence of the feature in the scene is much more readily and accurately determined when an optimum bipolar reference is employed.

Optical area correlators in accordance with the present invention as described in detail hereinbelow make it possible to employ references which are bipolar. A reference may, therefore, be the two-dimensional matched filter for the feature being sought. As explained previously, a two-dimensional matched filter is the theoretically optimum reference for representing a feature.

SPECIFIC EMBODIMENTS

Figure 3:
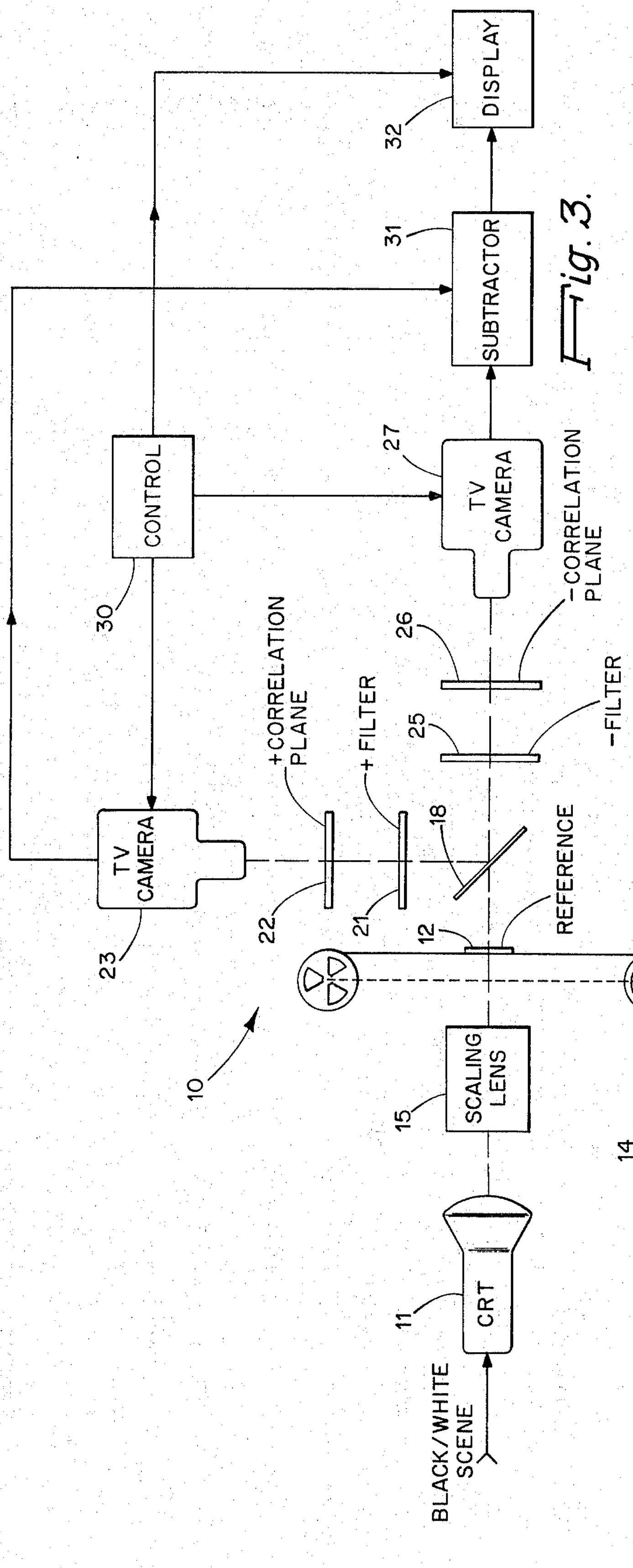
FIG. 3 is a diagrammatic representation of one embodiment of a bipolar area correlator in accordance with the present invention.

FIG. 3 illustrates a bipolar area correlator 10 in accordance with the present invention. The correlator includes a cathode ray tube 11 which is employed to display in black and white either a live or a stored scene which is to be investigated for the presence of a particular object or feature. The cathode ray tube also serves as an incoherent light source illuminating the image of the scene on its face. A plurality of references 12 may be stored as on reels 13 as illustrated schematically in FIG. 3 in order to permit a library of references to be readily available for correlation with a displayed scene. The references may be selected and moved into position by a reel drive 14. A scaling lens 15 is located between the cathode ray tube 11 and the reference 12 for adjusting the scene scale relative to the reference scale.

In this particular embodiment each bipolar reference is a transparency in two colors, for example, red and green. The red regions of the reference designate the positive values and the green regions designate the negative values. The reference is arranged across the path of light rays from the cathode ray tube 11 passing through the scaling lens 15. These light rays pass through the transparent regions of the reference and are divided into two paths by a beam splitter 18.

A red filter 12 lies acros the first path permitting the red components of light to pass but blocking the green components. The light rays which pass through the red filter 21 impinge on a + correlation plane 22. As shown in FIG. 3 the + correlation plane 22 is located externally of a first TV vidicon camera 23 which is sensitive to red light. In this particular arrangement the + correlation plane 22 is a ground glass plate so that the TV camera 23 can view the + correlation image formed at the plane. In lieu of this arrangement the ground glass plate may be omitted and the + correlation plane established directly at the photosensitive surface of the TV camera. In either case, the TV camera scans the + correlation image formed on its photosensitive surface and produces electrical signals varying with the light intensity of the elements of the image being scanned.

In a similar manner a green filter 25 lies across the second path permitting the green components of light to pass but blocking the red components. The green light rays impinge on a − correlation plane 26 to form a − correlation image. The image is viewed by a second TV camera 27 which is sensitive to green light. The two TV cameras 23 and 24 scan the correlation images formed at their photosensitive surfaces in synchronism under control of a control 30. The output signals from the TV cameras are applied to a linear subtractor 31 of well-known type. The subtractor 31 produces output signals which are the differences between the signals from the first TV camera 23 and the signals from the second TV camera 27. The resulting signals which represent a point-by-point subtraction of the two correlation images are applied to a TV type display 32 which is synchronized by the control 30 with the two TV cameras. The difference signals may also be stored in a processor and used for further signal analysis.

The optical area correlator as described directs light rays from the image of the scene through the reference 12 and along two separate optical paths, one for the + correlation components and one for the − correlation components. Two independent correlation images are instantaneously produced by the separate components at the + and − correlation planes 22 and 26. The TV cameras 23 and 27 individually convert the correlation images point-by-point to electrical signals. These signals are algebraically added by the subtractor 31. The output of the subtractor is applied to the TV display 32 which produces a resultant correlation image on its display surface for direct receiving. In accordance with the principles explained briefly hereinabove and discussed in detail in the aforementioned articles, features in the scene which are matched to the reference are markedly enhanced in the display.

Although the positive and negative regions of the references 12 as described in the embodiment of FIG. 3 are red and green, respectively, other mutually exclusive types of transparent regions may be used. For example, the + and − transparent regions of the reference may be optical polarizing material arranged to pass light rays of opposite polarity. With this arrangement the filters 21 and 25 are filters of polarizing material oriented to pass the light rays of the appropriate polarity. In addition, the filters 21 and 25 may be placed across the optical paths between the correlation planes 22 and 26 and the TV cameras 23 and 27, respectively, rather than as shown in FIG. 3.

Figure 4:
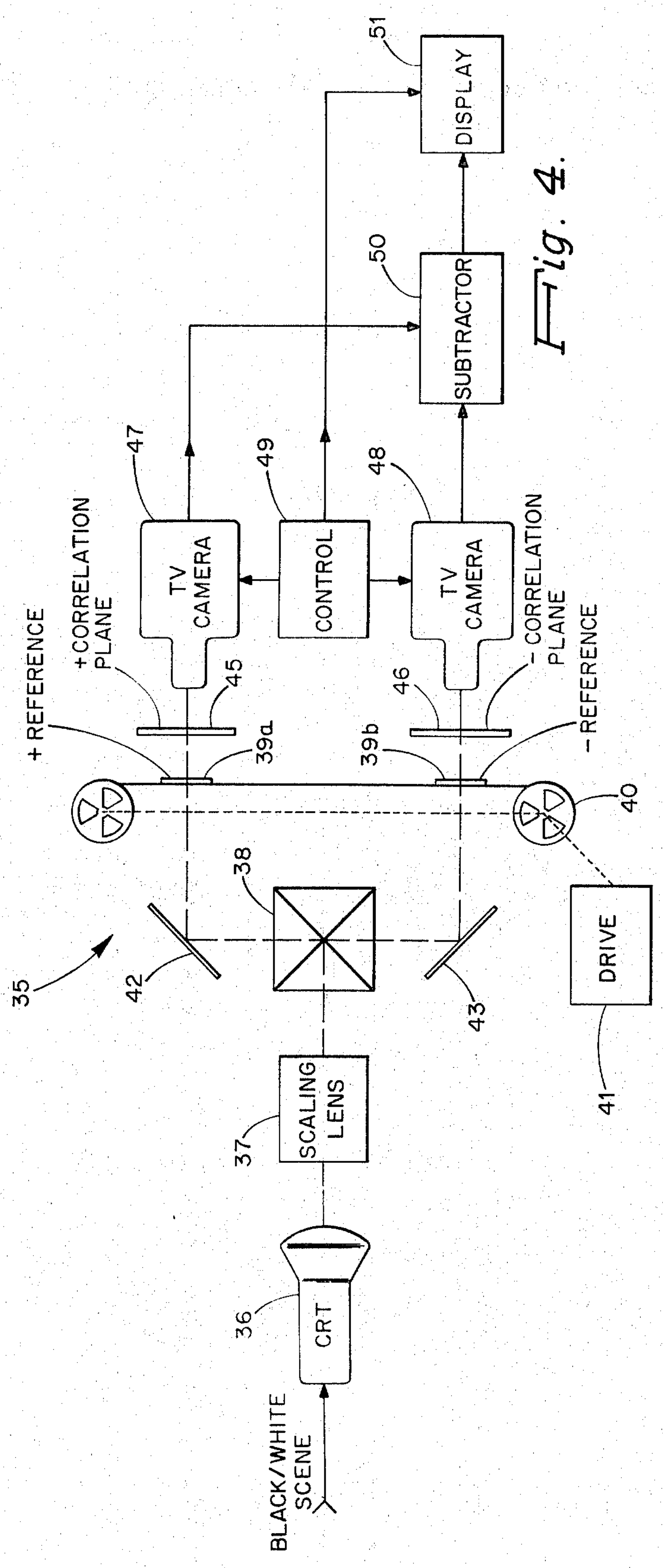
FIG. 4 is a diagram illustrating a second embodiment of a bipolar area correlator in accordance with the present invention.

FIG. 4 illustrates a second embodiment of a bipolar area correlator 35 in accordance with the present invention. In this embodiment a cathode ray tube display device 36 is employed as explained previously for displaying a black and white image of a scene. Light rays from the image on the cathode ray tube 36 pass through a scaling lens 37 to a two-way beam splitter 38. From the beam splitter the light rays are directed along two separate optical paths by reflecting mirrors 42 and 43.

Each reference is divided into two parts, the first part **39*a* containing the positive regions of the bipolar reference in the form of a black and white transparency and the second part 39*b* containing the negative regions in the form of a black and white transparency. As illustrated in FIG. 4, a library of references may be stored in strip form on reels 40 with the two parts of each reference separated so as to be interposed across the two optical paths. The reels 40 may be driven to conduct a search through the library of references by a drive 41.**

The positive components of light passing through the + reference **39*a* impinge on the + correlation plane 45 shown in FIG. 4 as a ground glass plate and form a + correlation image at the plane. The + correlation plane 45 is viewed by a first TV vidicon camera 47. The negative components of light passing through the − reference 39*b* impinge on the − correlation plane 46 and form a − correlation image which is viewed by a second TV camera 48. The TV cameras 47 and 48 are synchronized by a control 49. The output signals from the TV cameras are applied to a subtractor 50 where they are algebraically added to provide the correlation output signals. The correlation output may be viewed on a display 51** such as a TV monitor or stored for later analysis.

Figure 5:
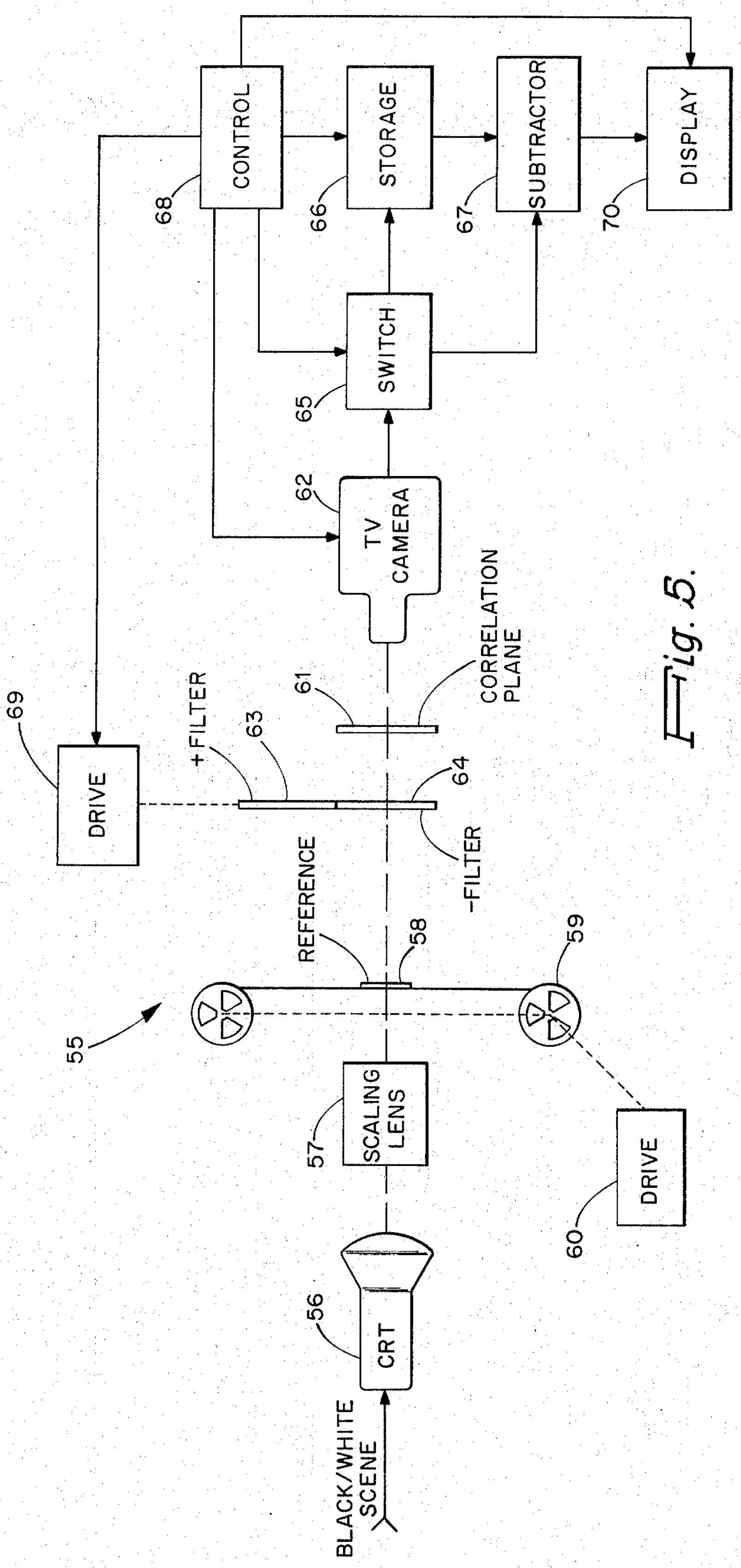
FIG. 5 is a diagram illustrating another bipolar area correlator in accordance with the present invention.

A third embodiment of an optical area correlator 55 is illustrated in FIG. 5. In this embodiment a cathode ray tube 56 and scaling lens 57 are employed as in previous embodiments. Each reference 58 is similar to those in the embodiment of FIG. 3, employing red transparent regions for positive values and green transparent regions for negative values. A library of references may be stored on reels 59 and individual references selected by operation of a drive 60.

A single correlation plane 61 and a single TV camera 62 are employed. Either a red transparent filter 63 or a green transparent filter 64 is placed across the path of light rays from the image reference 58. Depending upon which of the filters 63 and 64 are across the optical path either a + correlation image or a − correlation image is formed at the correlation plane 61. The filters 63 and 64 may be moved in to and out of the optical path either manually or by a drive 69. Although the filters 63 and 64 are shown as located between the reference 58 and the correlation plane 61, they may be placed between the correlation plane 61 and the TV camera 62.

The output of the TV camera 62, which is sensitive to green and red light, is directed by a switch 65 to either a storage unit 66 or a subtractor 67. The TV camera 62, switch 65, storage unit 66, filter drive 69, and also the display 70 are operated in synchronism by a control 68. When one of the filters, for example the red filter 63, is in position between the reference 58 and the correlation plane 61, the TV camera 62 makes a single scan of its photosensitive surface and produces electrical signals corresponding to the light intensity of the individual elements of the + correlation image. The signals are directed by the switch 65 to the storage unit 66. After scanning of the + correlation image is complete, the green filter 64 is placed in the optical path. The − correlation image is thus formed at the correlation plane 61. While the TV camera 62 is scanning the resulting − correlation image at its photosensitive surface, the stored data on the + correlation image is read out of the storage unit 64 in synchronism. The electrical signals from the TV camera 62 and those from the storage unit 66 are both applied to the subtractor to provide the correlation output signals to the display 70. The foregoing procedure may be repeated continuously to produce a continuous TV display. The apparatus may be modified to store the electrical signals from the TV camera during scanning of both the + and − correlation images with the signals being read out simultaneously and repeatedly applied to the subtractor for display at a later time.

Figure 6:
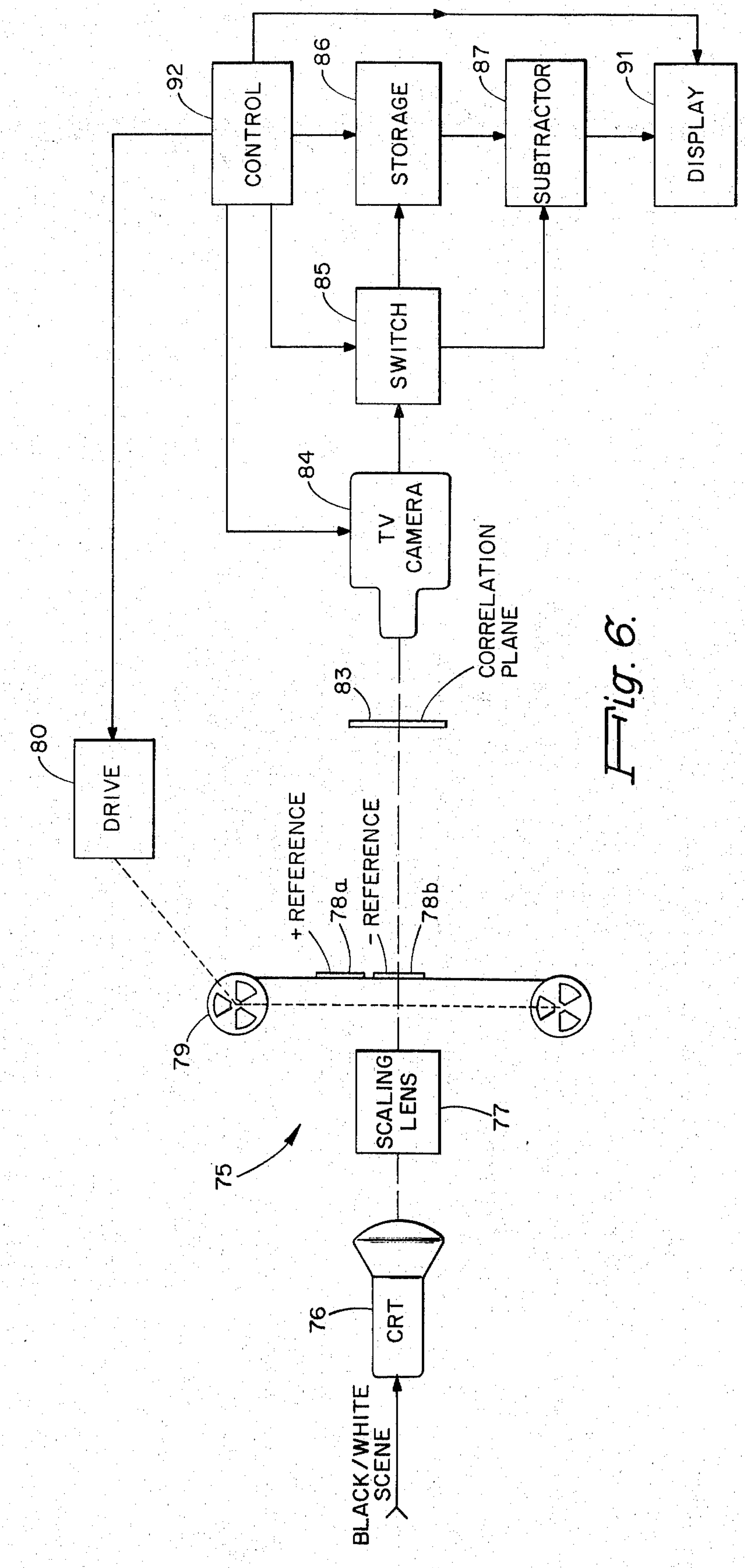
FIG. 6 is a diagram illustrating a fourth embodiment of a bipolar area correlator in accordance with the present invention.

FIG. 6 illustrates an area correlator 75 which is a modification of the apparatus of FIG. 5. The correlator includes a cathode ray tube 76 for producing an image of a scene and a scaling lens 77. Each reference is in two parts as in the correlator of FIG. 4. One part **78*a* is a black and white transparency containing the positive values of the reference and the other part 78*b* is a black and white transparency containing the negative values of the reference. The references preferably are mounted on reels 79 which are driven by a reel drive 80. The light rays from the cathode ray tube 76 pass through the transparent regions of the reference and form a + or − correlation image at the correlation plane 83 depending on whether the + or − reference 78*a* or 78*b* is in position across the optical path. A single TV camera 84 is employed and its output is directed by a switch 85 to either a storage unit 86 or a subtractor 87. The reel drive 80, TV camera 84, switch 85, storage unit 86, and also a display 91 are operated in synchronism by a control 92**.

With the + reference **78*a* in place across the optical path and a + correlation image formed at the correlation plane 83, the electrical signals produced by the TV camera 84 during a single scan of the + correlation image are stored in the storage unit 86. When the + reference 78*a* is replaced with the − reference 78*b*, the output from the TV camera 84 while scanning the − correlation image is directed by the switch 85 to the subtractor 87. In synchronism with this scan of the TV camera, the stored electrical signals are read out of the storage unit 86 and applied to the subtractor 87. The resulting correlation output from the subtractor 87 is applied to the display 91**.

An optical area correlator in accordance with the present invention may utilize a library of bipolar references stored, for example, on reels. References representing a plurality of features in a variety of orientations may be included in the reference library and positioned sequentially in the optical path so that a scene can be investigated rapidly in searching for a number of different features. The correlation output from the subtractor may be applied to other than a TV monitor in order to display or record the correlation output data. The image of the scene produced by the cathode ray tube may be a live scene or may be generated from stored data. The use of a scaling lens together with the cathode ray tube provides flexibility for adjusting the scale of a scene, particularly a live scene, on the cathode ray tube to the scale of the reference.

A bipolar area correlator in accordance with the present invention permits correlation of references with a live scene. By the use of incoherent light together with scenes and references which are planar areas the correlation output is obtained instantaneously over the entire scene. A transparency is not required for the image of a scene since a cathode ray tube provides an image of a scene and a diffused incoherent light source for illuminating the scene. The procedure requires no computation and, therefore, it is not necessary to store voluminous amounts of data for use in the correlation operation. The apparatus thus provides all the advantages of known incoherent area correlators and, in addition, permits the use of bipolar references thereby greatly enhancing the degree of correlation obtainable.

While there has been shown and described what are considered preferred embodiments of the present invention, it will be obvious to those skilled in the art that various changes and modifications may be made therein without departing from the invention as defined in the appended claims. For example, other types of image displays which provide incoherent light such as liquid crystal and plasma displays may be employed in place of a cathode ray tube. In addition, the library of transparent references may be provided by a transparent liquid crystal array which is appropriately energized by signals based on reference data stored in a computer.

What is claimed is:

1. A bipolar area correlator including in combination image producing means for producing an image of a scene;

a reference representing a feature to be correlated with an image of a scene produced by said image producing means, said reference having first and second transparent regions;

a first correlation plane for forming a first correlation image thereat;

a second correlation plane for forming a second correlation image thereat;

first image converting means for converting a first correlation image at said first correlation plane to electrical signals;

second image converting means for converting a second correlation image at said second correlation plane to electrical signals;

first optical control means for permitting light rays from the image of a scene produced by said image producing means which pass through said first transparent regions in the reference to impinge on said first correlation plane and form thereat a first correlation image which is converted to electrical signals by the first image converting means, while preventing light rays from the image of the scene produced by said image producing means which pass through said second transparent regions in the reference from reaching the first image converting means;

second optical control means for permitting light rays from the image of a scene produced by said image producing means which pass through said second transparent regions in the reference to impinge on said second correlation plane and form thereat a second correlation image which is converted to electrical signals by the second image converting means, while preventing light rays from the image of the scene produced by said image producing means which pass through said first transparent regions in the reference from reaching the second image converting means; and subtractor means coupled to said first and second image converting means and operable to produce output signals which are the differences of the electrical signals from the first and second image converting means.

2. A bipolar area correlator in accordance with claim 1 wherein said first transparent regions of the reference are of one type, and said second transparent regions are of another type;

said first optical control means includes first filtering means interposed between said reference and said first image converting means for permitting light rays from an image of a scene produced by said image producing means which pass through the transparent regions of the one type to pass therethrough to the first correlation plane and form thereat a first correlation image which is converted to electrical signals by the first image converting means, and for preventing light rays from an image of a scene which pass through the transparent regions of the other type from passing therethrough to the first image converting means; and said second optical control means includes second filtering means interposed between said reference and said second correlation plane for permitting light rays from an image of a scene produced by said image producing means which pass through the transparent regions of the other type to pass therethrough to the second correlation plane and form thereat a second correlation image which is converted to electrical signals by the second image converging means, and for preventing light rays from an image of a scene which pass through the transparent regions of the one type from passing therethrough to the second image converting means.

3. A bipolar area correlator in accordance with claim 2 wherein said first image converting means includes a surface for forming the first correlation image thereon and means for scanning said surface to produce a series of electrical signals varying with the light intensity of the elements of the image being scanned;

said second image converting means includes a surface for forming the second correlation image thereon and means for scanning said surface to produce a series of electrical signals varying with the light intensity of the elements of the image being scanned; and including control means for synchronizing the scanning of the respective surfaces of the first and second image converting means; and wherein said subtractor means is operable to produce a series of output signals each of which is the difference between the electrical signals produced at the same instant by the first and second image converting means.

4. A bipolar area correlator in accordance with claim 3 wherein said first and second optical control means include beam splitting means for directing light rays from an image of a scene produced by said image producing means along separate first and second optical paths, the light rays along said first optical path being directed toward said first correlation plane and said first image converting means, and the light rays along said second optical path being directed toward said second correlation plane and said second image converting means;

said reference is disposed intermediate said image producing means and said beam splitting means;

said first filtering means is interposed across first optical path; and said second filtering means is interposed across said second optical path.

5. A bipolar area correlator in accordance with claim 4 wherein said first transparent regions of the reference are of one color, and said second transparent regions of the reference are of another color;

said first filtering means includes a filter which passes light of said one color and blocks light of said other color; and said second filtering means includes a filter which passes light of said other color and blocks light of said one color.

6. A bipolar area correlator in accordance with claim 4 wherein said first transparent regions of the reference are of polarizing material arranged to permit light of one polarity to pass therethrough, and said second transparent regions of the reference are of polarizing material arranged to permit light of the opposite polarity to pass therethrough;

said first filtering means includes a polarizing filter which passes light of the one polarity and blocks light of the opposite polarity; and said second filtering means includes a polarizing filter which passes light of the opposite polarity and blocks light of the one plurality.

7. A bipolar area correlator in accordance with claim 4 wherein said reference representing a feature is substantially the exact matched filter of the feature with said first regions of the reference designating numerical values of one polarity and said second regions of the reference designating numerical values of the opposite polarity.

8. A bipolar area correlator in accordance with claim 4 wherein said image producing means includes a cathode ray tube; and including a scaling lens interposed between said cathode ray tube and said reference.

9. A bipolar area correlator in accordance with claim 4 including display means of the type producing an image on a display surface by scanning said display surface while receiving signals at the input thereto; and wherein;

said control means is coupled to the display means and is operable to synchronize the scanning of the display surface with the scanning of the surfaces of the first and second image converting means; and the input of said display means is coupled to the subtractor means for receiving the output signals from the subtractor means, whereby a resultant correlation image is produced on the display surface of the display means.

10. A bipolar area correlator in accordance with claim 1 wherein said reference includes two portions, a first portion having said first transparent regions and a second portion having said second transparent regions;

said first and second optical control means include beam splitting means disposed intermediate the image producing means and the portions of the reference for directing light rays from an image of a scene produced by said image producing means along separate first and second optical paths; the light rays along said first optical path being directed to said first portion of the reference, passing through the first transparent regions, and impinging on said first correlation plane; and the light rays directed along said second optical path being directed to said second portion of the reference, passing through the second transparent regions, and impinging on said second correlation plane.

11. A bipolar area correlator in accordance with claim 10 wherein said first image converting means includes a surface for forming the first correlation image thereon and means for scanning said surface to produce a series of electrical signals varying with the light intensity of the elements of the image being scanned;

said second image converting means includes a surface for forming the second correlation image thereon and means for scanning said surface to produce a series of electrical signals varying with the light intensity of the elements of the image being scanned; and including control means for synchronizing the scanning of the respective surfaces of the first and second image converting means; and wherein said subtractor means is operable to produce a series of output signals each of which is the difference between the electrical signals produced at the same instant by the first and second image converting means.

12. A bipolar area correlator in accordance with claim 11 wherein said reference representing a feature is substantially the exact matched filter of the feature with said first regions of the reference designating numerical values of one polarity and said second regions of the reference designating numerical values of the opposite polarity.

13. A bipolar area correlator in accordance with claim 11 wherein said image producing means includes a cathode ray tube; and including a scaling lens interposed between said cathode ray tube and said reference.

14. A bipolar area correlator in accordance with claim 11 including display means of the type producing an image on a display surface by scanning said display surface while receiving signals at the input thereto; and wherein said control means is coupled to the display means and is operable to synchronize the scanning of the display surface with the scanning of the surfaces of the first and second image converting means; and the input of said display means is coupled to the subtractor means for receiving the output signals from the subtractor means, whereby a resultant correlation image is produced on the display surface of the display means.

15. A bipolar area correlator including in combination image producing means for producing an image of a scene;

a reference representing a feature to be correlated with an image of a scene produced by said image producing means, said reference having first and second transparent regions;

a correlation plane for forming correlation images thereat;

image converting means for converting a correlation image at said correlation plane to electrical signals;

optical control means for permitting light rays from the image of a scene produced by said image producing means which pass through said first transparent regions in the reference to impinge on said correlation plane and form thereat a first correlation image which is converted to electrical signals by the image converting means, while preventing light rays from the image of the scene produced by said image producing means which pass through said second transparent regions in the reference from reaching the image converting means; and for permitting light rays from the image of a scene produced by said image producing means which pass through said second transparent regions in the reference to impinge on said correlation plane and form thereat a second correlation image which is converted to electrical signals by the image converting means, while preventing light rays from the image of the scene produced by said image producing means which pass through said first transparent regions in the reference from reaching the image converting means;

storage means coupled to said image converting means for storing the electrical signals produced by the image converting means when light rays from the image of a scene are passing through said first transparent regions in the reference and impinging on the correlation plane; and subtractor means coupled to the image converting means and to the storage means and operable to produce output signals which are the differences of the electrical signals stored in the storage means and the electrical signals produced by the image converting means when light rays from the image of the scene are passing through said second transparent regions in the reference and impinging on the correlation plane.

16. A bipolar area correlator in accordance with claim 15 wherein said image converting means includes a surface for forming the correlation image thereon and means for scanning said surface to produce a series of electrical signals varying with the light intensity of the elements of the image being scanned;

said storage means is operable to store a first series of electrical signals produced by the image converting means during a single scan of said surface;

said subtractor means has a first input terminal and a second input terminal; and including control means for reading out the first series of electrical signals stored in the storage means and applying them to the first input terminal of the said subtractor means in synchronism with applying to the second input terminal of said subtractor means a second series of electrical signals produced by the image converting means during another single scan of said surface; and wherein said subtractor means is operable to produce a series of output signals each of which is the difference between the electrical signals at said first and second input terminals at the same instant.

17. A bipolar area correlator in accordance with claim 16 wherein said first transparent regions of the reference are of one type, and said second transparent regions are of another type;

said optical control means includes first filtering means for permitting light rays from an image of a scene produced by said image producing means which pass through the transparent regions of the one type to pass therethrough to the correlation plane and form thereat a first correlation image which is converted to electrical signals by the image converting means, and for preventing light rays from an image of a scene which pass through the transparent regions of the other type from passing therethrough to the image converting means; and second filtering means for permitting light rays from an image of a scene produced by said image producing means which pass through the transparent regions of the other type to pass therethrough to the correlation plane and form thereat a second correlation image which is converted to electrical signals by the image converting means, and for preventing light rays from an image of a scene which pass through the transparent regions of the one type from passing therethrough to the image converting means; and including means for interposing said first filtering means between said reference and said image converting means when the electrical signals produced by the image converting means are being stored in said storage means; and means for interposing said second filtering means between said reference and said image converting means when the electrical signals produced by the image converting means are not being stored in the storage means.

18. A bipolar area correlator in accordance with claim 17 wherein said reference representing a feature is substantially the exact matched filter of the feature with said first regions of the reference designating numerical values of one polarity and said second regions of the reference designating numerical values of the opposite polarity.

19. A bipolar area correlator in accordance with claim 17 wherein said image producing means includes a cathode ray tube; and including a scaling lens interposed between said cathode ray tube and said reference.

20. A bipolar area correlator in accordance with claim 16 wherein said reference includes two portions, a first portion having said first transparent regions and a second portion having said second transparent regions; and said optical control means includes means for causing said first portion of the reference to be interposed across the path of light rays from an image of a scene produced by said image producing means to the correlation plane while the electrical signals produced by the image converting means are being stored in said storage means, and for causing said second portion of the reference to be interposed across the path of light rays from an image of a scene produced by said image producing means to the correlation plane while the electrical signals produced by the image converting means are not being stored in said storage means.

21. A bipolar area correlator in accordance with claim 20 wherein said reference representing a feature is substantially the exact matched filter of the feature with said first regions of the reference designating numerical values of one polarity and said second regions of the reference designating numerical values of the opposite polarity.

22. A bipolar area correlator in accordance with claim 20 wherein said image producing means includes a cathode ray tube; and including a scaling lens interposed between said cathode ray tube and said reference.

23. A bipolar area correlator in accordance with claim 17 including display means of the type producing an image on a display surface by scanning said display surface while receiving signals at the input thereto; and wherein said control means is coupled to the display means and is operable to synchronize the scanning of the display surface with the reading out of electrical signals from said storage means and the applying of electrical signals to the second input terminal of said subtractor means; and the input of said display means is coupled to the subtractor means for receiving the output signals from the subtractor means, whereby a resultant correlation image is produced on the display surface of the display means.

* * * * *